United States Patent [19]

Pinto

[11] Patent Number: 4,527,487
[45] Date of Patent: Jul. 9, 1985

[54] SUSPENSION AND COUPLING DEVICE BETWEEN A BOGIE FRAME AND AN AXLE BOX

[75] Inventor: Georges Pinto, Chagny, France

[73] Assignee: Creusot-Loire, Paris, France

[21] Appl. No.: 467,560

[22] PCT Filed: Jun. 18, 1982

[86] PCT No.: PCT/FR82/00102
§ 371 Date: Feb. 17, 1983
§ 102(e) Date: Feb. 17, 1983

[87] PCT Pub. No.: WO82/04423
PCT Pub. Date: Dec. 23, 1982

[30] Foreign Application Priority Data

Jun. 19, 1981 [FR] France .................. 81 12085

[51] Int. Cl.$^3$ .................. B61F 5/30
[52] U.S. Cl. .................. 105/223; 105/224 R; 105/224.1
[58] Field of Search .......... 105/224.1, 224 R, 218 R, 105/219, 220, 223

[56] References Cited

U.S. PATENT DOCUMENTS

| | | | |
|---|---|---|---|
| 2,836,130 | 5/1958 | Rossel | 105/224.1 |
| 3,841,233 | 10/1974 | Sinclair | 105/224.1 |
| 4,109,586 | 8/1978 | Briggs et al. | 105/223 |

FOREIGN PATENT DOCUMENTS

| | | |
|---|---|---|
| 323230 | 6/1975 | Austria . |
| 1455148 | 2/1969 | Fed. Rep. of Germany . |
| 1490064 | 7/1967 | France . |
| 2317145 | 2/1977 | France . |

Primary Examiner—Robert R. Song
Attorney, Agent, or Firm—Pollock, Van Sande & Priddy

[57] ABSTRACT

Device for ensuring the vertical suspension of the chassis of a bogie and the longitudinal and transverse coupling of each box of the chassis in a driving or carrying railway bogie, comprising a vertical suspension spring through which the bogie frame is supported on the axle box, thereby creating a rotary torque on this box, and including two flexible couplings mounted spaced in altitude between the frame and the axle box so as to be compressed when the axle box tends to rotate under the effect of the rotary torque. The rotary torque is provided by two suspension springs of helicoidal spring type which are mounted on each side of the vertical plane passing through the axis of the axle, and by the fact that each vertical coupling is constituted by at least one elastic stud forming a monoblock whose terminal cross-sections are fixed to a support surface of the bogie frame and to a support surface of the axle box, so that the compressive force due to the suspension springs results in low shear strength in the vertical direction.

8 Claims, 2 Drawing Figures

SUSPENSION AND COUPLING DEVICE BETWEEN A BOGIE FRAME AND AN AXLE BOX

FIELD OF THE INVENTION

The present invention relates to a device for providing vertical suspension of the chassis or frame of a bogie and the longitudinal and transverse coupling of each box of said chassis in a railway driving or carrying bogie.

BACKGROUND OF THE INVENTION

In a bogie suspension, flexibility in the vertical direction between the bogie chassis and each axle box must be provided. It is also necessary for each axle box to be guided with respect to the chassis, longitudinally and transversely.

Various types of bogie are known in which elastic studs are mounted between the bogie frame and each axle box.

In certain bogies, the suspension and coupling between the frame and each axle box are formed solely by means of studs of elastomer framing this axle box. Each elastic stud is housed between two parallel support surfaces slightly inclined with respect to the vertical. The studs are positioned in pairs in dihedra whose bisector planes are vertical, this arrangement enabling a vertical load of combined compressive and shearing stresses to be supported. The rigidity in the vertical direction is not negligable.

In other bogies, helicoidal springs for ensuring the vertical suspension are associated with studs of elastomer providing the flexible couplings. In certain bogies each elastomer stud is housed between two parallel support surfaces slightly inclined with respect to the vertical. These flexible studs are positioned in pairs in dihedra of which the bisector planes are vertical so that the vertical loads are supported with combined compressive and shearing stresses. The elastomer studs are mounted in parallel with the vertical suspension springs. This arrangement disturbs operation particularly with high frequency stresses.

In other bogies the suspension and coupling between the chassis and the axle box are formed by a helicoidal spring and elastic studs which frame the axle box. Each elastic stud is housed between two vertical support surfaces and the elastomer material is prestressed by squeezing. Under the effect of creep the prestressing diminishes in time.

SUMMARY OF THE INVENTION

It is an object of the present invention to provide a device ensuring the vertical suspension of a bogie chassis and the longitudinal and transverse coupling of each axle box and capable of procuring, without disturbing the vertical suspension, a certain radial and axial flexibility of the axle. This devices uses studs—of elastomeric material—which are prestressed, so that the prestressing does not develop either in time nor in the course of oscillations of the suspension. Through this fact, the steering characteristics are constant and independent of the creep of the material and the vertical dynamics of the suspension are not modified. These dynamics are however modifiable by construction and by the choice of the characteristics of the elastomers used.

The device according to the invention comprises two vertical suspension springs through which the bogie frame is supported on the axle box, creating a rotary torque on this box, and includes two flexible couplings mounted spaced in altitude between the frame and the axle box so as to be compressed when the axle box rotates under the action of the rotary torque. It is essentially characterized by the fact that the rotary torque is given by two suspension springs of helicoidal spring type which are mounted on each side of the vertical plane passing through the axle box, and by the fact that each flexible coupling is constituted by at least one elastic stud forming a monoblock part whose terminal cross-sections are fixed to a support surface of the bogie frame and to a support surface of the axle box, so that the effect of compression due to the suspension springs results in a shearing rigidity weak in the vertical direction.

According to a feature of the invention, the stiffnesses of the two springs and the respective distances of these springs with respect to the vertical plane passing through the axis of the axle are determined so that the torque acting on the axle box is substantially constant whatever the movements of the axle, the product of the stiffness of one spring by the distance of this spring with respect to the vertical plane being substantially equal to the product of the stiffness of the other spring by the distance of this spring with respect to said vertical plane.

BRIEF DESCRIPTION OF THE DRAWINGS

The invention will now be described in more detail with reference to an embodiment given purely by way of illustrative example and shown in the accompanying drawings.

DESCRIPTION OF PREFERRED EMBODIMENT

Figure 2:
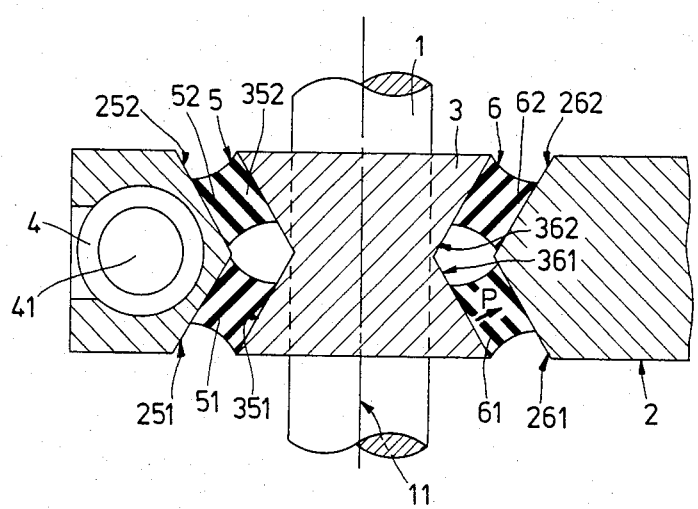
FIG. 2 shows a section along the line A—A of FIG. 1
Figure 1:
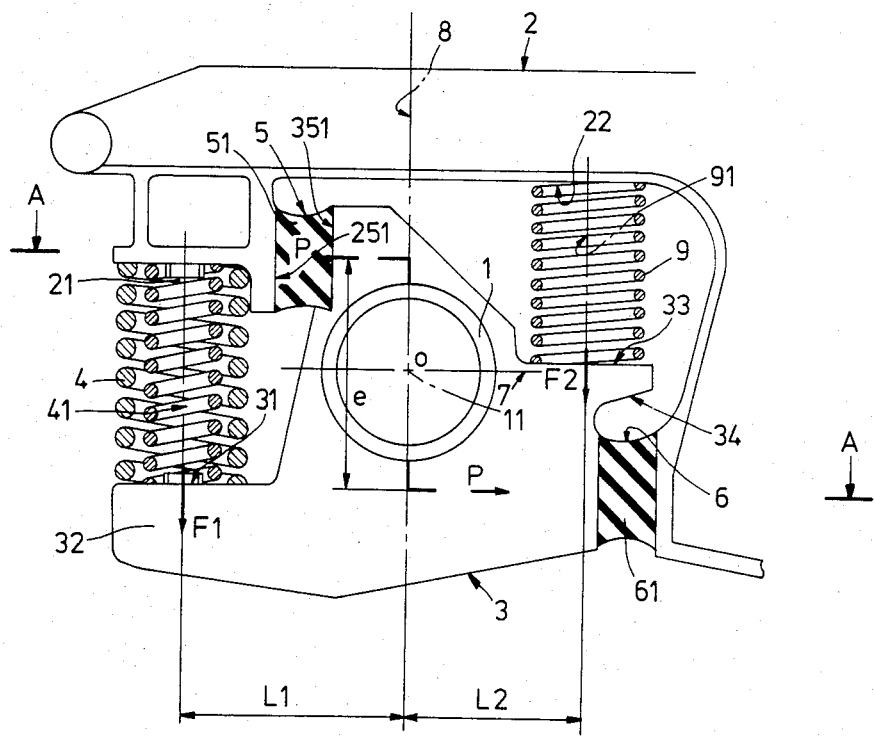
FIG. 1 is a view in elevation of the suspension and coupling device mounted between the bogie chassis and an axle box.

The bogie shown by FIGS. 1 and 2 comprises a bogie frame 2 on a train of rolling members comprising axles 1. Each axle is equipped with two axle boxes 3. The vertical suspension associated with each axle box is ensured by two vertical suspension springs 4 and 9 of the helicoidal steel type. Each helicoidal spring 4 or 9 may be constituted either by a single spring or by several springs mounted coaxially. Each helidoical spring 4 or 9 is mounted vertically between the bogie frame and the axle box. The two springs are mounted on each side of the vertical plane 8 passing through the axis of the axle.

The spring 4 is housed so as to be compressed between a horizontal upper bearing 21 of the frame and a horizontal lower bearing 31 formed on the bracket 32 of the axle box. The vertical axis of this spring 4 is off-set from the vertical plane 8 by a distance $L_1$ which is not nil. The second spring 9 is housed so as to be compressed between the horizontal upper bearing 22 of the frame and a horizontal lower bearing 33 formed on the bracket 34 of the axle box. The vertical axis 91 of the spring 9 is off-set with respect to the vertical plane 8 by a distance $L_2$ which is not nil. The positioning of the springs 4 and 9 with respect to the vertical plane 8 passing through the axis of the shaft is such that the body of the axle box is subjected to forces $F_1$ and $F_2$ located at distances respectively $L_1$ and $L_2$ from the vertical plane 8 and it is subjected by this fact to the positive rotary torque $C=F_1L_1-F_2L_2$. In order that this torque C may remain constant in the course of the vertical oscillations of the axle, the stiffnesses $K_1$ of the spring 4 and $K_2$ of the spring 9 must correspond with the relationship: $K_1L_1=K_2L_2$.

The axle box is coupled to the bogie chassis by flexible couplings 5 and 6 which are each constituted preferably by two elastic studs. The flexible coupling 5 is constituted by two flexible studs 51,52, the flexible coupling 6 being constituted by the two studs 61, 62. The flexible coupling 5 and the flexible coupling 6 are mounted spaced in altitude to balance the torque applied to the axle box.

The upper flexible coupling constituted by the elastic studs 51 and 52 is situated on the side of the spring 4 and of the resultant of the forces $F_1$, $F_2$ with respect to the vertical plane passing through the axis 11 of the axle. It is situated above the horizontal plane 7 passing through the axis of revolution 11 of the axle, between the vertical plane passing through the axis of the helicoidal spring 4 and the vertical plane 8 passing through the axis 11. The lower flexible coupling formed by the studs 61–62 is situated on the side of the spring 9 with respect to the vertical plane 8 passing through the axis of the axle. The flexible coupling 5 and 6 are respectively situated on both sides of the vertical plane through the axis 11 of revolution of the axle and also on both sides of the horizontal plane 7.

Each elastic stud has a prismatic or cylindrical shape of which the terminal cross-sections are parallel and fixed respectively against a support surface of the axle box and a support surface of the bogie frame.

Thus the studs 51 and 52 are inserted respectively between the support surfaces 351 and 352 of the axle box which are facing the spring 4 and the opposite support surfaces 251 and 252 which are formed on the bogie frame. The lower studs 61 and 62 are inserted respectively between the support surfaces 361 and 362 of the axle box and the opposite support surfaces 261 and 262, formed on the bogie frame. The two support surfaces of each elastic stud are substantially vertical.

The upper support surfaces 351, 352 of the box relative to the upper coupling are oriented on the side of the resultant of the forces $F_1$ and $F_2$. The lower support surfaces 361, 362 of the box are turned towards the side opposite this resultant. The support surfaces of the axle box 351, 352 and 361, 362 are thus in opposition. Due to the fact of their arrangement, the elastic studs are compressed when the axle box tends to pivot under the effect of the torque applied by the springs 4 and 9. Each elastic stud 51, 52, 61, 62 constitutes a monoblock part capable of supporting, without possibility of separation, of slipping or of rubbing of its constituent parts, a tractive, compressive or shearing force or a combined force applied between its end sections which are fixed without the possibility of separation, or slippage, respectively to a support surface of the axle box and to a support surface of the bogie frame. The terminal sections—preferably planar—are constituted by rigid metal plates bonded to the elastomer or rubber material and immobilized respectively against the support surfaces of the axle box and of the bogie chassis. Each elastic stud comprises an elastomer material between the metal end plates. It may be constituted by a sandwich or laminar structure formed by elastomer plates and metal plates arranged alternately, the plates of elastomer material being bonded to the intercalary metal plates.

The support surfaces of the studs of elastomer on the axle box and the bogie frame may be arranged according to one of the various arrangements currently known, as a function of the performance required for the steering of the axle box and as a function of the type of bogie. The support surfaces of the studs, either against the axle box or against the bogie frame, which are preferably flat, could nonetheless be constituted by cylindrical surfaces.

The two support surfaces of each flexible coupling either to the bogie frame or to the axle box have an arrangement as a dihedral like that shown in FIG. 2. The two support surfaces 251 and 252 on the chassis, of the two upper elastic studs of the upper flexible coupling and the two opposite support surfaces 351 and 352 of the axle box then form dihedral having a common bisector plane perpendicular to the axis of revolution of the axle. Similarly the two support surfaces 261 and 262 on the chassis, of the two lower elastic studs and the two opposite support surfaces 361 and 362 on the axle box form dihedral having a common bissector plane perpendicular to the axis of revolution of the axle. In this type of arrangement, the elastic studs 51 and 52 are mounted in chevron fashion, symmetrically with respect to the vertical plane passing through the axis 41 and perpendicular to the axis of revolution of the axle. The lower elastic studs 61 and 62 are also mounted in chevron fashion, symmetrically with respect to the previously defined plane.

The elastic studs are identical from the point of view of dimensions and from the point of view of constitution.

The vertical suspension spring 4 and the upper elastic studs 51, 52 are mounted towards the outside of the bogie with respect to the vertical plane 8 passing through the axis of revolution of the axle. The vertical suspension spring 9 and the lower elastic studs 61, 62 are mounted towards the center of the bogie with respect to this same vertical plane 8.

The operation of the device will now be described below.

The vertical suspension springs 4 and 9 exert on the axle box a torque C equal to $F_1L_1-F_2L_2$ which tends to rotate the axle box around its axis 11 by compressing the elastic studs 51, 52, 61 and 62. These elastic studs are subjected to a compressive force P defined by $P=C/e$, e corresponding to the separation in altitude between the upper flexible coupling and the lower flexible coupling. This force is independent of the vertical oscillations of the axle. In fact, for a vertical movement H of the axle, the force $F_1$ varies by an amount $f_1$ such that $f_1=K_1h$ and the force $F_2$ varies by an amount $f_2=K_2h$. The variation of the torque on the axle box is such that $dC=f_1L_1-f_2L_2$ namely $dC=K_1hL_1=K_2hL_2=h(K_1L_1-K_2L_2)$. The second factor of this product being nil by construction, the variation in torque dC is nil. The torque acting on the axle box is constant and independent of the movements of the axle. The prestressing P is hence also constant. The mechanical properties of the elastomer material of the studs 51, 52, 61 and 62 are such that the compressive force P results in a shearing rigidity—in the vertical direction—which is low but adjustable according to the nature of the elastomer. This rigidity is not disturbed during vertical movements of the axle. However, this rigidity value, may be selected by construction at the desired value according to the nature of the elastomer used. In particular, it is possible to select a composition of the elastomer which ensures the desired damping of the dynamic effects in the vertical plane.

In the radial direction of the axle, i.e., in the longitudinal direction materialized by the direction 7, the elastic studs ensure with a certain flexibility, the longitudinal driving of the axle. In the axial direction of the axle, i.e., parallel to the axis of revolution 11, the elastic studs ensure with a certain flexibility the lateral or transverse steering of the axle.

The longitudinal axes of the studs (parallel to the lateral surfaces) are convergent (as in FIG. 2) or perpendicular to the axes of the axle. In the latter case, certain intercalary plates may be common to two adjacent elastic studs forming a chevron unit.

What is claimed is:

1. Device for the suspension and coupling of a bogie chassis to an axle box, comprising a vertical suspension spring through which the bogie chassis is supported on the axle box, thereby creating a rotary torque on said box, and comprising two couplings mounted spaced in altitude between said bogie chassis and said axle box so as to be compressed when said axle box tends to rotate under the effect of the rotary torque, wherein said rotary torque is provided by two suspension springs of the helicoidal spring type, mounted on each side of the vertical plane passing through the axis of an axle, and each coupling is constituted by at least one elastic stud forming a monoblock part whose terminal sections are fixed to a support surface of said bogie chassis and to a support surface of said axle box so that the compressive force due to said suspension springs results in a low shear strength in the vertical direction.

2. Device according to claim 1, wherein the stiffnesses $K_1$, $K_2$ of said two springs and the distances $L_1$, $L_2$ respectively for said springs with respect to the vertical plane passing through the axis of said axle are determined so that the torque acting on said axle box is substantially constant and independent of the vertical movements of said axle, the product of the stiffness $K_1$ of said spring by the distance $L_1$ of said spring with respect to the vertical plane passing through the axis of said axle being substantially equal to the product of the stiffness $K_2$ of said spring by the distance $L_2$ of said spring with respect to said vertical plane.

3. Device according to claim 1 or 2, wherein said couplings are arranged on each side of the vertical plane passing through the axis of said axle.

4. Device according to claim 1 or 2, wherein said flexible couplings are arranged on each side of the horizontal plane passing through the axis of said axle.

5. Device according to claim 1 or 2, wherein said two support surfaces of each elastic stud respectively on said bogie chassis and on said axle box are substantially vertical.

6. Device according to claim 1 or 2, wherein said upper studs and lower studs are mounted substantially symmetrically with respect to the axis of said axle.

7. Device according to claim 1 or 2, wherein said upper flexible coupling is mounted on the side of the resultant of the forces acting on said springs with respect to the vertical plane passing through the axis of said axle.

8. Device according to claim 1 or 2, wherein said support surfaces of said flexible couplings on said axle box and on said bogie chassis form dihedral whose bisector planes are perpendicular to the axis of said axle.

* * * * *